July 7, 1942.  J. T. RUIST ET AL  2,288,651

MULTI-THROW CRANKSHAFT

Filed Feb. 13, 1941

INVENTORS
John Ture Ruist
Gustaf Adolf Fredrik Laryd

THEIR ATTORNEY

Patented July 7, 1942

2,288,651

UNITED STATES PATENT OFFICE 2,288,651

MULTITHROW CRANKSHAFT

John Ture Ruist and Gustaf Adolf Fredrik Laryd, Goteborg, Sweden

Application February 13, 1941, Serial No. 378,742
In Sweden March 6, 1940

3 Claims. (Cl. 74—597)

The present invention relates to improvements in multi-throw crankshafts, especially crankshafts for looms or the like. The purpose of the invention is to provide a crankshaft design in which undivided ball or roller bearings can be used as intermediate bearings or on the crank pin. This type of bearing is considerably superior to plain bearings as regards cleanliness, low friction and fire risk and is further more endurable than roller bearings with split race rings.

In connection with certain machines it has been suggested to provide large radii where the crank cheeks connect to the crank pin and to the end of the shaft in order that a ball or roller bearing may be applied to the crank pin from the end of the shaft. In looms and similar machines it is however impossible to shape the crank shaft in this manner for the reason that the outer crank cheek must be perpendicular to the shaft because of the limited space available. The width of the goods which can be woven in the loom is limited by the distance between the connecting rods connected to the crank shaft for operating the slay beam. The connecting rods should therefore be located as near to the frame of the machine as is possible, in order to utilize as far as possible the available width within the space permitted by the frame of the machine.

Figure 1:
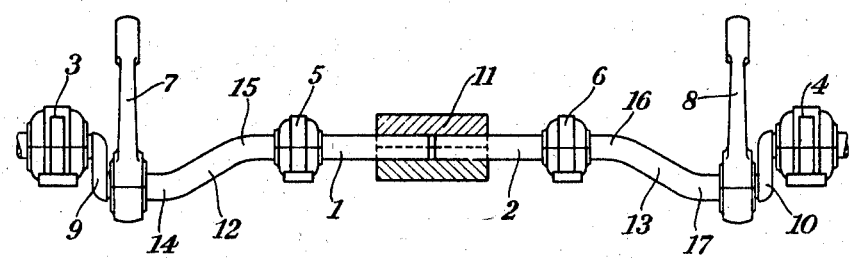
Figure 2:
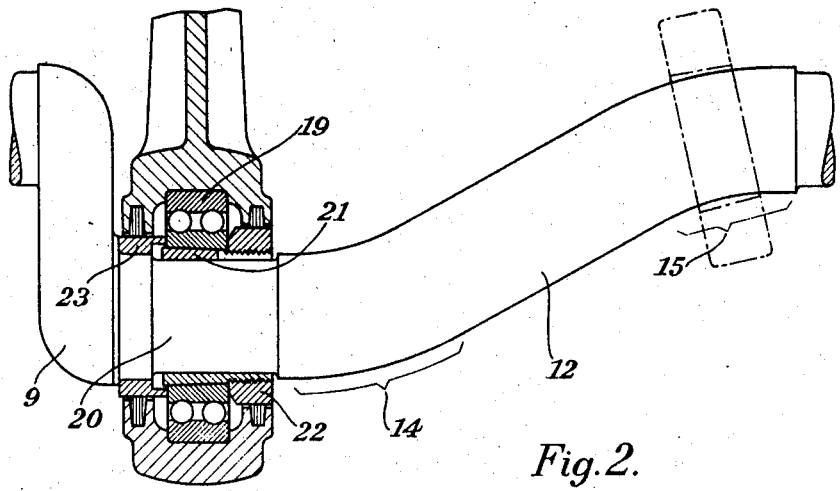

An embodiment of the invention is illustrated on the accompanying drawing in which Fig. 1 shows the main or crank shaft of a loom and connecting rod connected thereto, and Fig. 2 shows on an enlarged scale and partly in section a crank and a connecting rod head.

In Fig. 1 the numerals 1 and 2 denote parts of a crank shaft which together form a complete crank shaft. The crank shaft is carried in main bearings 3 and 4 and intermediate bearings 5 and 6. The shaft shown has two crank throws and a connecting rod 7 and 8 respectively is mounted on each, the other ends of the connecting rods being connected to the slay beam. The width of the material which can be woven in the loom is as a rule determined by the distance between the connecting rods 7 and 8 which should therefore be located as far apart as possible, that is, they should be located as close as possible to the main bearings 3 and 4. For this reason the outer crank cheeks 9 and 10 must be made perpendicular to the shaft, and it is therefore not possible to mount an undivided ball or roller bearing in the intermediate bearing housings or on the crank pins by applying it from the end of the crank shaft. According to the invention therefore the crank shaft is divided into two parts 1 and 2 at a place intermediate of the crank throws. The axis of this intermediate portion coincides with the axis of rotation of the crankshaft. The halves of the crankshaft are connected to each other by means of a removable coupling 11 of any suitable type, for instance a compression coupling or the like. The coupling is preferably provided with keys and keyways or with splines to prevent relative twisting of the parts. The invention makes it possible to use undivided ball or roller bearings in the intermediate bearing housings 5 and 6. In order that such ball or roller bearings may be applied to the crank pins, the inner crank cheeks 12 and 13 are connected to the crank pin through parts 14 and 17 having relatively large curvature and to the intermediate portion of the crank shaft by parts 15 and 16 also having fairly large curvature, whereby it is possible to pass the bearing over the curved parts as is shown in Fig. 2.

The ball bearing 19 is mounted on the crank pin 20 by means of a split taper sleeve 21 which is inserted between the bearing and the pin and on which the bearing is pressed by the aid of a nut 22 screwed onto the sleeve 21 after the parts have been brought into position. In this way the bearing can be made with such a large bore that it easily passes the curves 14 and 15, as shown in Fig. 2 by means of dot and dash lines. The sleeve is split as above mentioned and therefore need not be threaded over the crank cheek 12. The position of the bearing 19 on the crank pin is fixed by the aid of a distance ring 23. This ring is relatively narrow and there is therefore no difficulty in passing it over the curves in the crankshaft. The connecting rod head is preferably of split type.

The connecting rod bearings are first put into place on the crank pins before the bearing housings 5 and 6 are applied and preferably before the parts of the shaft are mounted in the bearings 3 and 4.

The crank shaft is originally made whole which facilitates machining of the bearing seats etc. after which it is divided at a suitable place between the crank throws.

The invention is naturally not limited to the embodiment illustrated, there being other embodiments conforming to the invention.

Having thus described our invention, we claim and desire to secure by Letters Patent the following:

1. A multi-throw crankshaft especially for looms and the like, characterized thereby that the crank shaft is divided at an intermediate portion located between two crank throws, the axis of the said intermediate portion coinciding with the axis of rotation of the crankshaft, the said parts being connected by means of a removable coupling, there being portions of relatively large radius of curvature connecting the inner crank cheeks to the intermediate portion and to the crank pins respectively.

2. A multi-throw crank shaft especially for looms and the like, said crank shaft being divided at a point between two crank throws and in an intermediate portion coinciding with the axis of rotation of the crank shaft, the proximate cheek of at least one of the cranks being connected to the said intermediate portion and to the crank pin by portions of relatively large radius of curvature so as to afford passage by way of said cheek for an anti-friction bearing to the pin, said cheek and connecting portions constituting the sole available path for passage of said bearing to the crank pin, and a coupling detachably secured to and connecting the free ends of said intermediate portion at opposite sides of the division.

3. A multi-throw crank shaft especially for looms and the like, said crank shaft being divided at a point between two crank throws and in an intermediate portion coinciding with the axis of rotation of the crank shaft, the proximate cheeks of said cranks being connected to the said intermediate portion and to the respective crank pins by portions of relatively large radius of curvature so as to afford passage by way of said cheeks and said curved connections for an anti-friction bearing to the pin, the ultimate cheeks of said cranks being in close coupled relation to the respective pins precluding passage thereover to the crank pins whereby said proximate cheeks and curved connecting portions constitute the sole available path for passage of the bearings to the crank pins, and a coupling detachably secured to and connecting the free ends of said intermediate portion at opposite sides of the division.

JOHN TURE RUIST.
GUSTAF ADOLF FREDRIK LARYD.